United States Patent
Kim et al.

(10) Patent No.: US 10,331,248 B2
(45) Date of Patent: Jun. 25, 2019

(54) TOUCH-INTEGRATED DISPLAY DEVICE

(71) Applicant: LG Display Co., Ltd., Seoul (KR)

(72) Inventors: Hyunho Kim, Daegu (KR); MinBo Kim, Gyeongsan-si (KR); Dongmin Seo, Chilgok-gun (KR); Inseop Kim, Busan (KR)

(73) Assignee: LG Display Co., Ltd., Seoul (KR)

(*) Notice: Subject to any disclaimer, the term of this patent is extended or adjusted under 35 U.S.C. 154(b) by 72 days.

(21) Appl. No.: 15/377,977

(22) Filed: Dec. 13, 2016

(65) Prior Publication Data

US 2017/0192568 A1 Jul. 6, 2017

(30) Foreign Application Priority Data

Dec. 30, 2015 (KR) .................. 10-2015-0189203

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
CPC ....... G06F 3/0412; G06F 3/0416; G06F 3/044
See application file for complete search history.

(56) References Cited

U.S. PATENT DOCUMENTS

| | | | |
|---|---|---|---|
| 2006/0176266 A1* | 8/2006 | Pak ..................... | G02F 1/13338 345/104 |
| 2011/0084993 A1* | 4/2011 | Kawabe ............... | G09G 3/2014 345/691 |
| 2012/0086654 A1* | 4/2012 | Song ..................... | G06F 3/0412 345/173 |
| 2014/0320767 A1* | 10/2014 | Xu ........................ | G06F 3/0412 349/12 |
| 2016/0147348 A1* | 5/2016 | Liu ....................... | G06F 3/0412 345/173 |
| 2017/0160844 A1* | 6/2017 | Li .......................... | G01R 31/02 |

* cited by examiner

*Primary Examiner* — Towfiq Elahi
(74) *Attorney, Agent, or Firm* — Fenwick & West LLP

(57) ABSTRACT

A disclosed display device includes a plurality of touch electrodes, a plurality of sensing lines, and a plurality of transistors. Each of the touch electrodes includes a group of common voltage electrodes among a plurality of common voltage elongated along a first direction. The plurality of sensing lines are elongated along a second direction and intersects the plurality of common voltage electrodes. Each of the plurality of sensing lines is coupled to a corresponding group of the common voltage electrodes. The plurality of pixels include a plurality of transistors. Each of the plurality of transistors controls an amount of light output from a corresponding pixel of the plurality of pixels according to a voltage at a gate electrode of said each of the plurality of transistors. The gate electrode is formed in a corresponding separation area between two adjacent common voltage electrodes of the plurality of common voltage electrodes.

18 Claims, 8 Drawing Sheets

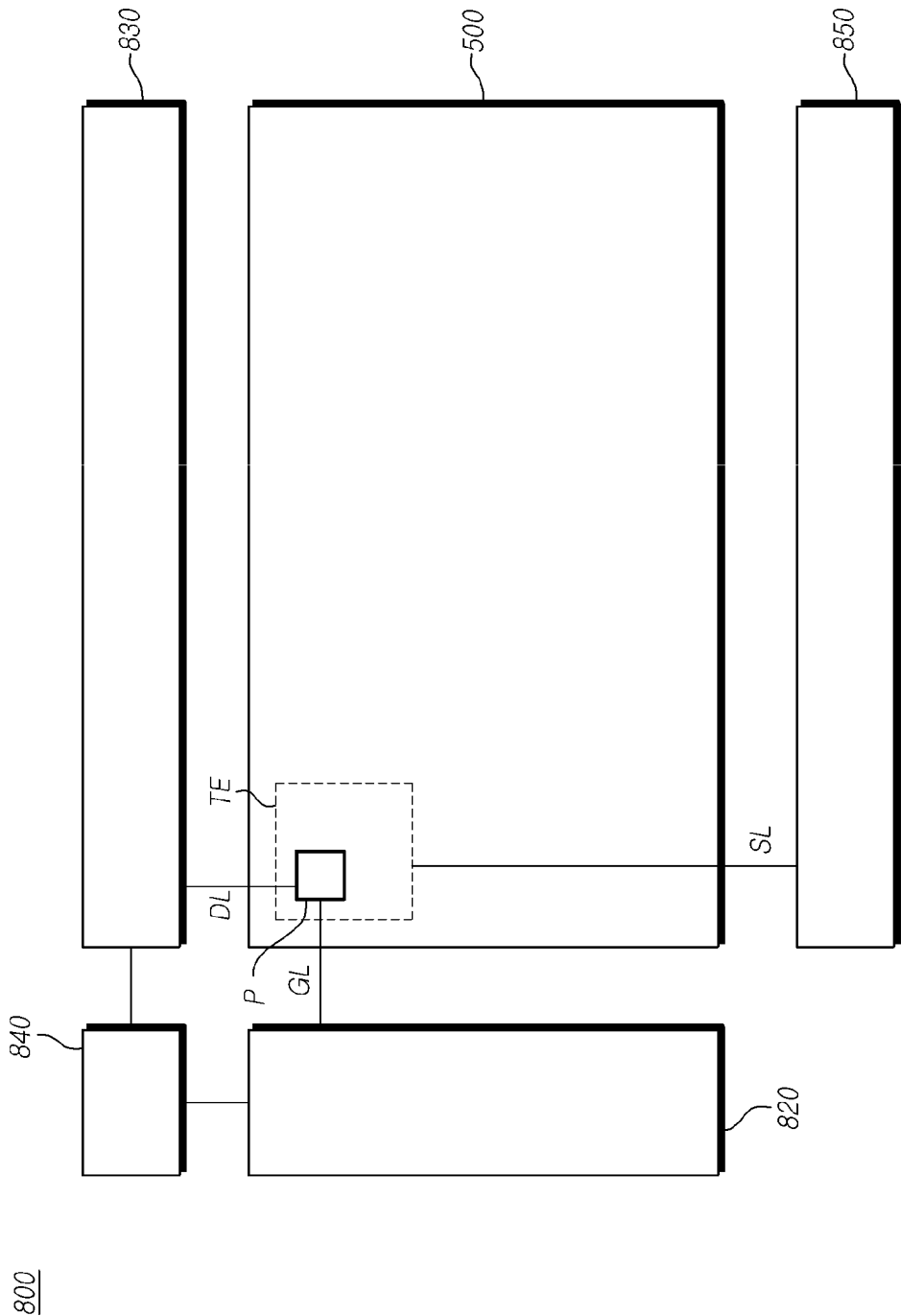

TOUCH-INTEGRATED DISPLAY DEVICE

CROSS-REFERENCE TO RELATED APPLICATION

This application claims priority from Republic of Korea Patent Application No. 10-2015-0189203, filed on Dec. 30, 2015, which is hereby incorporated by reference for all purposes as if fully set forth herein.

BACKGROUND

Related Field

One or more embodiments disclosed herein relate to a touch-integrated display device in which a touch electrode is positioned inside a display panel.

Description of the Related Art

With progress of the information-oriented society, various types of demands for display devices for displaying an image are increasing. Recently, various types of display devices such as a liquid crystal display (LCD) device, a plasma display panel (PDP) device, or an organic light emitting diode (OLED) display device have been used.

Of these display devices, the LCD device includes an array substrate including a transistor, an upper substrate including a color filter and/or a black matrix, and a liquid crystal layer formed therebetween, and displays an image by controlling an alignment state of the liquid crystal layer according to an electric field applied between a pair of electrodes of a pixel area and thus controlling transmittance of light.

A display panel of the LCD device is defined as an active area (AA), which provides an image to a user, and a non-active area (NA), which is adjacent to the AA. The display panel is commonly manufactured by combining a first substrate with a second substrate. The first substrate is an array substrate on which a typical transistor is formed and a pixel area is defined. The second substrate is an upper substrate on which a black matrix and/or a color filter layer may be formed.

The array substrate or the first substrate on which the transistor is formed includes a plurality of gate lines (GLs) extending in a first direction, and a plurality of data lines (DLs) extending in a second direction. One pixel area (P) is defined by each gate line and each data line. In one pixel area (P), one or more transistors are formed, and a gate electrode or a source electrode of each transistor is connected to each gate line and data line.

Further, in order to provide a scan signal and a data voltage necessary to drive each pixel to each gate line and data line, a gate driver, and a data driver, are formed in the NA or outside the panel.

Meanwhile, in recent years, display panels having a function of detecting a touch input of a stylus pen or a user's finger have been developed. In one example, a touch screen is installed on a display panel. In another example, a touch electrode required for touch recognition may be integrated in a touch-integrated display panel.

Of these display panels, the touch-integrated display panel may use a common voltage electrode (Vcom), which typically supplies a common voltage to a pixel of a display panel, as a touch electrode by processing the common voltage electrode into a specific form.

Touch electrodes may not be distributed densely as pixels. Thus, typically, one touch electrode is disposed over a plurality of pixel areas. If the common voltage electrode is configured as a touch electrode, a plurality of common voltage electrodes each corresponding to multiple pixel areas forms one touch electrode.

However, in a conventional display panel, when a touch electrode is disposed over a plurality of pixel areas, a common voltage electrode positioned at an outer periphery of the touch electrode is different in size from a common voltage electrode positioned inside the touch electrode. Touch electrodes are spaced apart from each other with a predetermined separation distance in order to prevent electrically being connected to each other. In the conventional display panel, a separation distance between touch panels is secured by reducing the size of common voltage electrodes positioned at an outer periphery of a touch electrode. However, common voltage electrodes positioned inside the touch electrode do not need to secure a separation distance and thus can maintain their own size.

Meanwhile, a transistor positioned in a pixel area is capacitively coupled to the common voltage electrode. The amount of coupling capacitance varies depending on the size of the common voltage electrode.

However, as described above, in the conventional display panel, the common voltage electrode positioned at the outer periphery of the touch electrode is different in size from the common voltage electrode positioned inside the touch electrode. Thus, there is a difference in coupling capacitance between a transistor positioned at the outer periphery of the touch electrode and a transistor positioned inside the touch electrode.

A capacitance of a transistor, particularly, a capacitance formed in a gate electrode, affects a gate-source voltage. Specifically, as a capacitance of the gate electrode is increased, a gate-source voltage is decreased. If a transistor does not have a sufficient gate-source voltage, a data voltage cannot be fully transferred to a pixel electrode and a corresponding pixel may be recognized as a defect. In some cases, pixels positioned at an outer periphery of a touch electrode may be simultaneously recognized as defects and thus a horizontal line defect may occur.

In a conventional display panel, a difference between a size of a common voltage electrode positioned at an outer periphery of the touch electrode and a size of a common voltage electrode positioned inside the touch electrode causes such a pixel defect or horizontal line defect.

SUMMARY

In one or more embodiments, a display device is disclosed. The display device comprises: a plurality of touch electrodes, each of the touch electrodes including a group of common voltage electrodes among a plurality of common voltage electrodes elongated along a first direction; a plurality of sensing lines elongated along a second direction and intersecting the plurality of common voltage electrodes, each of the plurality of sensing lines coupled to a corresponding group of the common voltage electrodes; and a plurality of pixels including a plurality of transistors, each of the plurality of transistors to control an amount of light output from a corresponding pixel of the plurality of pixels according to a voltage at a gate electrode of said each of the plurality of transistors, the gate electrode formed in a corresponding separation area between two adjacent common voltage electrodes of the plurality of common voltage electrodes.

In one or more embodiments, the plurality of touch electrodes include: a first touch electrode including at least a first common voltage electrode and a second common voltage electrode adjacent to each other and separated by a first distance; and a second touch electrode including at least a third common voltage electrode and a fourth common voltage electrode adjacent to each other, the second common voltage electrode and the third common voltage electrode adjacent to each other and separated by a second distance equal to the first distance.

In one or more embodiments, the display device further includes: a plurality of gate lines coupled to the plurality of pixels, each of the plurality of gate lines configured to supply a scan signal to a gate electrode of a corresponding transistor of the plurality of transistors. The plurality of gate lines may be elongated along the first direction. Said each of the plurality of gate lines may be formed in the corresponding separation area between the two adjacent common voltage electrodes of the plurality of common voltage electrodes.

In one or more embodiments, said each of the plurality of transistors includes a channel region formed in the corresponding separation area between the two adjacent common voltage electrodes of the plurality of common voltage electrodes.

In one or more embodiments, the display device further comprises data lines overlapping with the plurality of sensing lines, the data lines configured to provide a data voltage for displaying an image to the plurality of transistors, the plurality of sensing lines disposed between the plurality of common voltage electrodes and the data lines.

In one or more embodiments, the display device further comprises a plurality of pixel electrodes, each of the plurality of pixel electrodes facing a corresponding common voltage electrode of the plurality of common voltage electrodes in the corresponding pixel of the plurality of pixels. The plurality of sensing lines may be formed on a same layer as the plurality of pixel electrodes.

Advantageously, a horizontal line defect occurring at an outer periphery of a touch electrode of a touch-integrated display device can be removed. In addition, the sizes of common voltage electrodes of each pixel area included in a touch electrode of the touch-integrated display device may be equalized. Furthermore, a difference between a capacitance of a transistor positioned inside of a touch electrode and a capacitance of a transistor positioned outside of the touch electrode can be reduced.

BRIEF DESCRIPTION OF THE DRAWINGS

The above and other aspects, features and other advantages of one or more embodiments will be more clearly understood from the following detailed description taken in conjunction with the accompanying drawings, in which:

FIG. 8 is a configuration view of a display device according to an exemplary embodiment.

DETAILED DESCRIPTION

Figure 1:
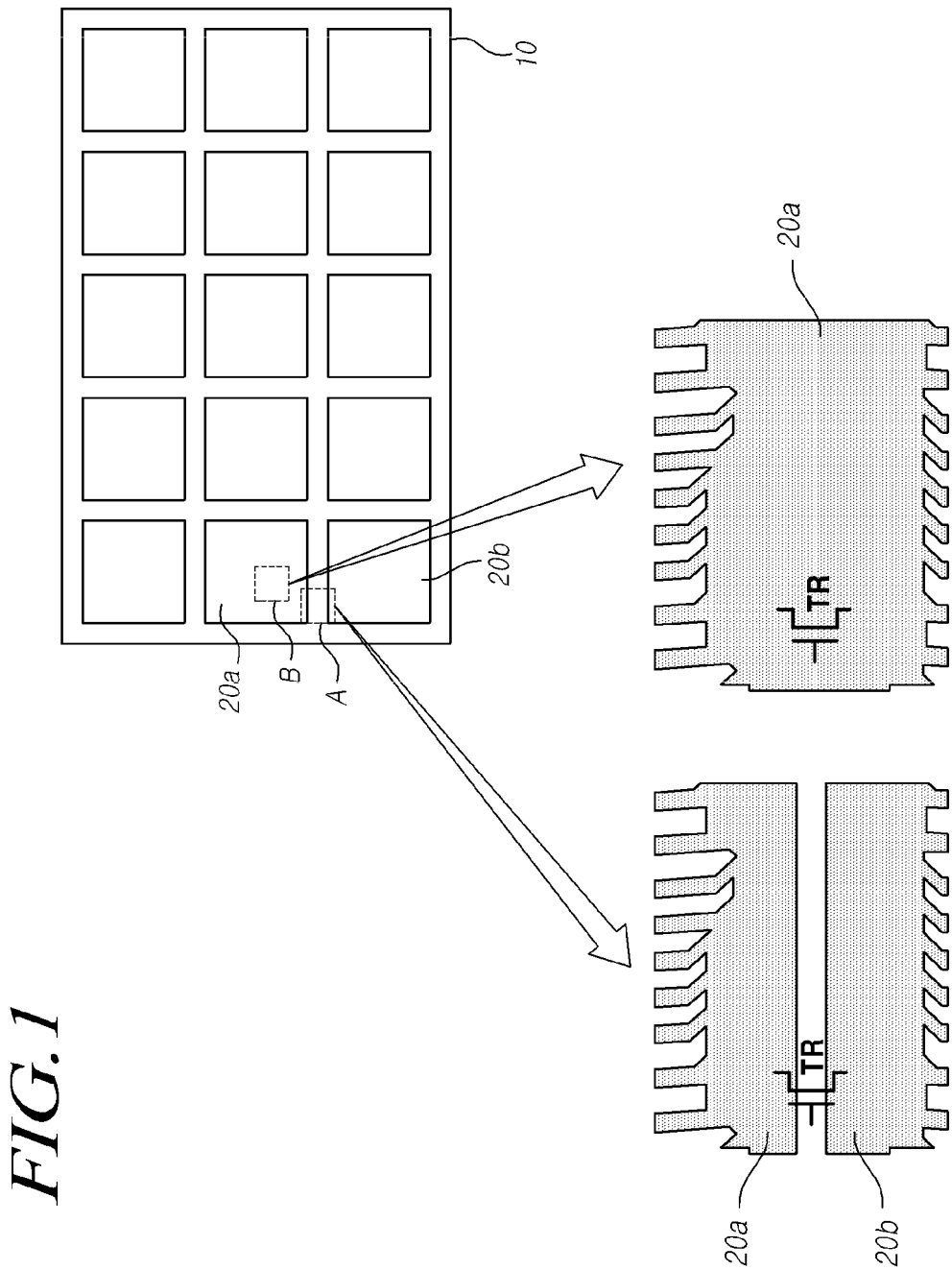
FIG. 1 is a diagram illustrating touch electrodes disposed in a conventional display panel.

Hereinafter, various embodiments will be described in detail with reference to the accompanying drawings. It should be noted that when reference numerals refer to components of each drawing, although the same components are illustrated in different drawings, the same components are referred to by the same reference numerals as possible. Further, if it is considered that description of related known configuration or function may cloud the gist of various embodiments disclosed herein, the description thereof will be omitted.

Further, in describing components of one or more embodiments disclosed herein, terms such as first, second, A, B, (a), and (b) can be used. These terms are used to differentiate the components from other components. Therefore, the nature, order, sequence, and the like of the corresponding components are not limited by these terms. It is to be understood that when one element is referred to as being "connected to" or "coupled to" another element, it may be directly connected or coupled to another element or be connected or coupled to another element, having still another element "connected" or "coupled" therebetween. In the same context, it is to be understood that when one element is referred to as being "on" or "below" another element, it may be directly coupled "on" or "below" another element or be connected "on" or "below" another element or may be indirectly coupled "on" or "below" another element or be connected "on" or "below" another element, having still another element intervening therebetween.

FIG. 1 is a diagram illustrating touch electrodes disposed in a conventional display panel.

Referring to FIG. 1, a plurality of touch electrodes 20 is disposed in a conventional display panel 10. Each of the touch electrodes 20 in the conventional display panel 10 is formed by combining a plurality of common voltage electrodes. In an area for the touch electrode 20, common voltage electrodes are connected to each other. In one or more embodiments disclosed herein below, the common voltage electrodes may not be formed over the entire touch electrode 20, but may be formed over pixel areas. If N×M number of pixels are disposed in the display panel 10 (where N and M are natural numbers), N×M number of common voltage electrodes may be disposed in the touch electrode 20.

Meanwhile, FIG. 1 illustrates an enlarged view of an area A corresponding to outer peripheral parts of a first touch electrode 20a and a second touch electrode 20b and an area B corresponding to the inside of the first touch electrode 20a.

Referring to the enlarged view of the area A, the first touch electrode 20a and the second touch electrode 20b are separated from each other with a predetermined distance and are electrically isolated from each other. Herein, in order to secure a separation distance between the touch electrodes, a part of a common voltage electrode is opened. The common voltage electrode is capacitively coupled to a transistor TR located under the common voltage electrode. The transistor TR located at an outer periphery of the touch electrode may have a relatively small amount of coupling capacitance since a part of the common voltage electrode is opened.

Referring to the enlarged view of the area B, since it is not necessary to secure a separation distance within the first touch electrode 20a, a wide common voltage electrode is formed. Further, not only for a separation distance but also for a connection to an adjacent common voltage electrode, a common voltage electrode disposed within a touch electrode is wider than a common voltage electrode disposed at an outer periphery of the touch electrode.

By comparison between the area A and the area B, a size of a common voltage electrode of a pixel positioned in the area B is greater than a size of a common voltage electrode of a pixel positioned in the area A. Accordingly, a transistor TR positioned in the area B has a greater amount of capacitance coupled to a common voltage electrode than a transistor TR positioned in the area A.

Figure 2:
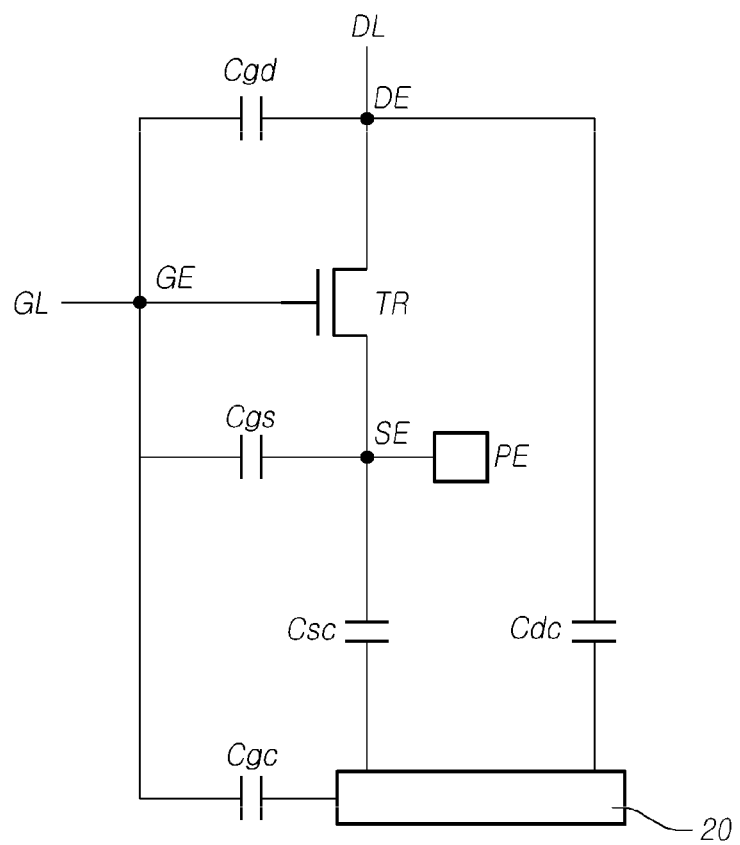
FIG. 2 is a diagram illustrating a capacitance formed between a transistor and an adjacent electrode.

FIG. 2 is a diagram illustrating a capacitance formed between a transistor and an adjacent electrode.

Referring to FIG. 2, a drain electrode DE of a transistor TR is connected to a data line DL and a source electrode SE is connected to a pixel electrode PE. The drain electrode DE and the source electrode SE may be interchanged. For example, the source electrode SE of the transistor SE may be connected to the data line DL. Further, a gate electrode GE of the transistor TR may be connected to a gate line GL.

Referring to FIG. 2, a capacitance Cgd may be formed between the gate electrode GE and the drain electrode DE, and a capacitance Cgs may be formed between the gate electrode GE and the source electrode SE. Further, a capacitance Csc may be formed between the source electrode SE and a common voltage electrode, a capacitance Cgc may be formed between the gate electrode GE and the common voltage electrode, and a capacitance Cdc may be formed between the drain electrode DE and the common voltage electrode.

The transistor TR is turned on in response to a scan signal transferred to the gate electrode GE, and a data voltage supplied to the data line DL is transferred to the pixel electrode PE. However, in this case, a gate voltage formed in the gate electrode GE may be affected by the amount of capacitance coupled to the gate electrode GE. For example, if the amount of capacitance coupled to the gate electrode GE is small, the amount of power required to charge the capacitance is small, and, thus, a gate voltage is increased. In the opposite case, a gate voltage is decreased. According to a change in the gate voltage of a transistor in a pixel, an amount of light output by the pixel may be changed.

In the conventional display panel 10 described with reference to FIG. 1, common voltage electrodes of pixel areas disposed at an outer periphery of the touch electrode and inside the touch electrode are different in sizes. In this case, the capacitances Csc, Cdc, and Cgc can be changed, and may affect a gate voltage.

If a gate voltage is decreased, a data voltage cannot be fully transferred to the pixel electrode PE, and, thus, a grayscale may be decreased. Otherwise, even if a gate voltage is maintained, when the amount of capacitance coupled to the gate electrode GE is increased, it may take a long time to turn on the transistor TR. Therefore, a grayscale of a corresponding pixel may be changed later than grayscales of other pixels. This may be recognized as a pixel defect, or a horizontal line defect.

A display device according to an exemplary embodiment has a first common voltage electrode disposed inside a touch electrode and a second common voltage electrode disposed at an outer periphery of the touch electrode, where each of the first common voltage electrode and the second common voltage electrode has an equal size.

Figure 3:
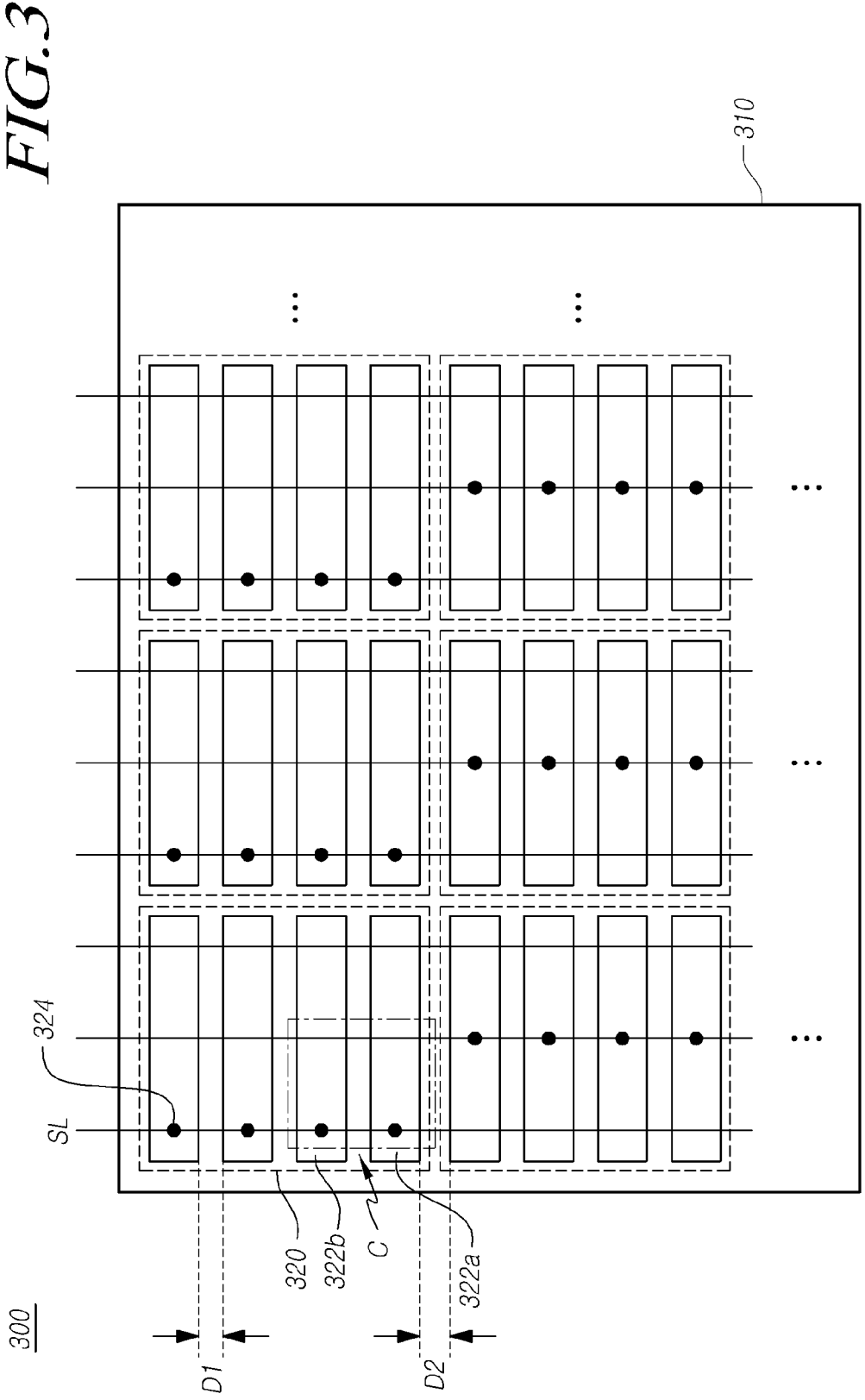
FIG. 3 is a diagram schematically illustrating a display panel and touch electrodes disposed in the display panel according to an exemplary embodiment.

FIG. 3 is a diagram schematically illustrating a display panel and touch electrodes disposed in the display panel according to an exemplary embodiment.

Referring to FIG. 3, a plurality of touch electrodes 320 may be disposed in a display panel 310.

Each touch electrode 320 may include a plurality of common voltage electrodes. Within the touch electrode 320, the common voltage electrodes in the same row may be connected to each other. A row formed by common voltage electrodes connected to each other is referred to as a common voltage electrode row. A plurality of common voltage electrode rows may be included in the touch electrode 320.

The common voltage electrodes may be connected to each other in the same row, or may be separated from each other in different rows. Common voltage electrode rows may be separated from each other.

More specifically, a first common voltage electrode row 322a positioned at an outer periphery of the touch electrode 320 and a second common voltage electrode row 322b positioned inside the touch electrode 320 may be separated from each other. Since common voltage electrodes in different rows are separated from each other, a common voltage electrode positioned inside a touch electrode and a common voltage electrode positioned at an outer periphery of the touch electrode may be equal in size.

The common voltage electrodes within the touch electrode 320 may be electrically connected to each other to function as a single common voltage electrode. In the display panel 310 according to an exemplary embodiment, a sensing line SL configured to transfer a touch driving signal to the touch electrode 320 is electrically connected to the common voltage electrodes separated from each other.

Within the touch electrode 320, the common voltage electrodes are physically separated from each other in a longitudinal direction of the sensing line SL. The sensing line SL is positioned in a different layer from the common voltage electrodes and is electrically connected to the common voltage electrodes physically separated from each other within the touch electrode 320 through a contact hole 324.

Since the sensing line SL is electrically connected to the common voltage electrodes physically separated from each other, the common voltage electrodes are connected to each other in a direction intersecting with the sensing line SL. In this aspect, the above-described common voltage electrode rows are disposed in the direction intersecting with the sensing line SL.

One sensing line SL may be connected to one touch electrode 320. Since a plurality of common voltage electrode rows are disposed in the one touch electrode 320, the one sensing line SL is connected to the common voltage electrode rows disposed in the one touch electrode 320 through the contact holes 324.

A plurality of common voltage electrodes disposed in one common voltage electrode row are connected to each other in the same layer. Thus, the sensing line SL can be connected to one common voltage electrode included in the common voltage electrode row. In some exemplary embodiments, the sensing line SL may be connected to two or more common voltage electrodes disposed in the common voltage electrode row.

Meanwhile, a separation distance D1 between common voltage electrodes in different rows within the touch electrode 320 may be substantially equal to a separation distance D2 between touch electrodes.

In another aspect, a plurality of common voltage electrodes are connected to each other in the direction intersecting with the sensing line SL, and, thus, when common voltage electrode rows are formed, the common voltage electrode rows may be disposed to be physically separated from each other with the same distance in the longitudinal direction of the sensing line SL. Further, the sensing line SL is connected to M number of common voltage electrode rows, and, thus, the M number of common voltage electrode rows connected to each other form one touch electrode 320.

With this configuration, a common voltage electrode disposed inside the touch electrode 320 and a common voltage electrode disposed at an outer periphery of the touch electrode 320 are separated from another common voltage electrode with the same distance and have the same size.

Figure 4:
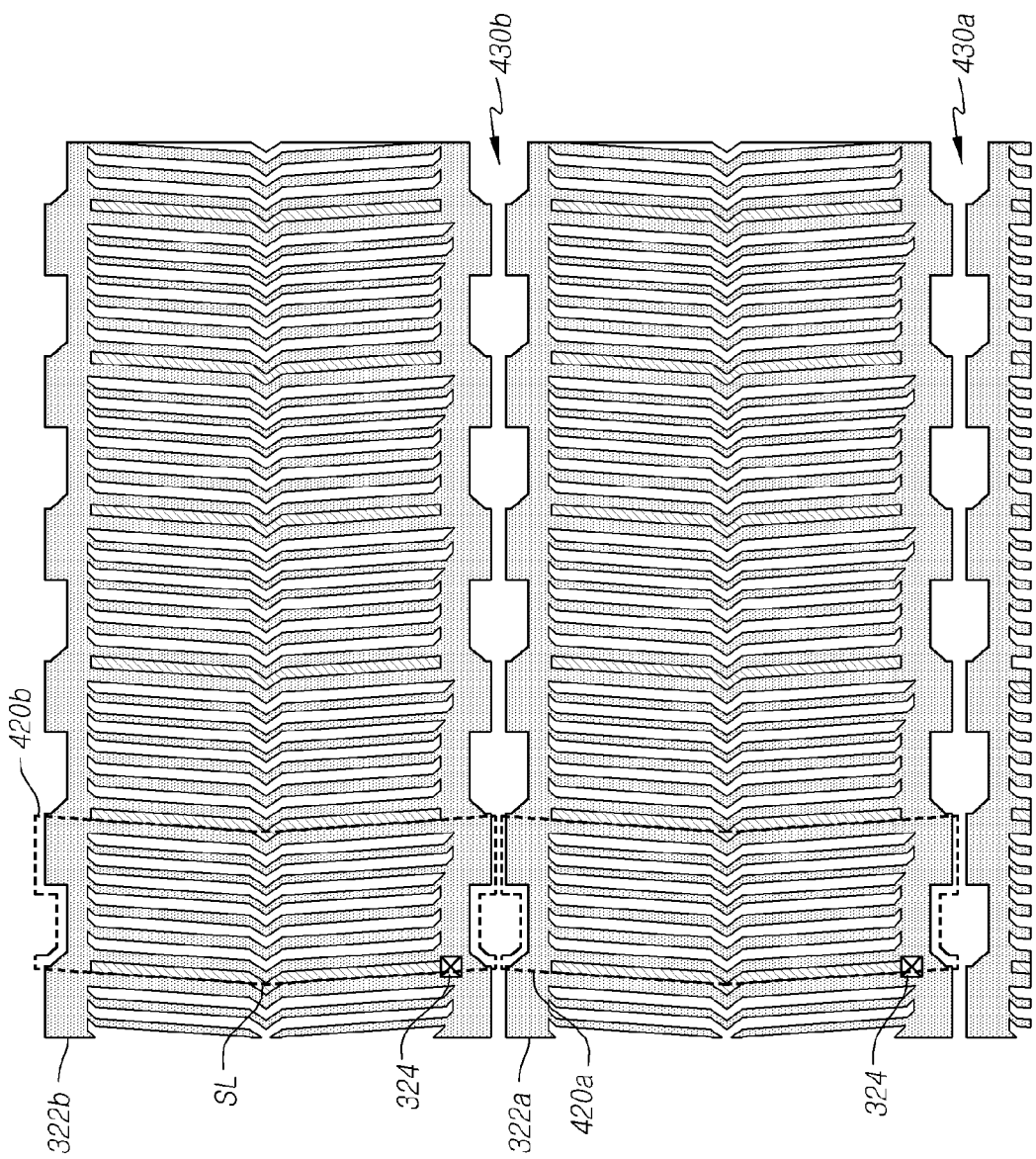
FIG. 4 is an enlarged view of an area C of FIG. 3.

FIG. 4 is an enlarged view of an area C of FIG. 3.

Referring to FIG. 4, the first common voltage electrode row 322a disposed at an outer periphery of the touch electrode 320 and the second common voltage electrode row 322b disposed inside the touch electrode 320 have substantially the same shape. Further, a first common voltage electrode 420a in the first common voltage electrode row 322a and a second common voltage electrode 420b in the second common voltage electrode row 322b have substantially the same shape.

A separation space 430a for electrically isolating two touch electrodes 320 is formed between the two touch electrodes. The separation space 430a may have substantially the same shape as a separation space 430b for separating common voltage electrode rows within a touch electrode 320.

Meanwhile, common voltage electrodes separated from each other within the touch electrode may be connected to each other through the sensing line SL positioned in another layer. Referring to FIG. 4, the contact hole 324 is formed in the first common voltage electrode 420a in the first common voltage electrode row 322a and the second common voltage electrode 420b in the second common voltage electrode row 322b. Further, the sensing line SL may be connected to the first common voltage electrode row 322a and the second common voltage electrode row 322b to each other through the contact holes 324.

Figure 5:
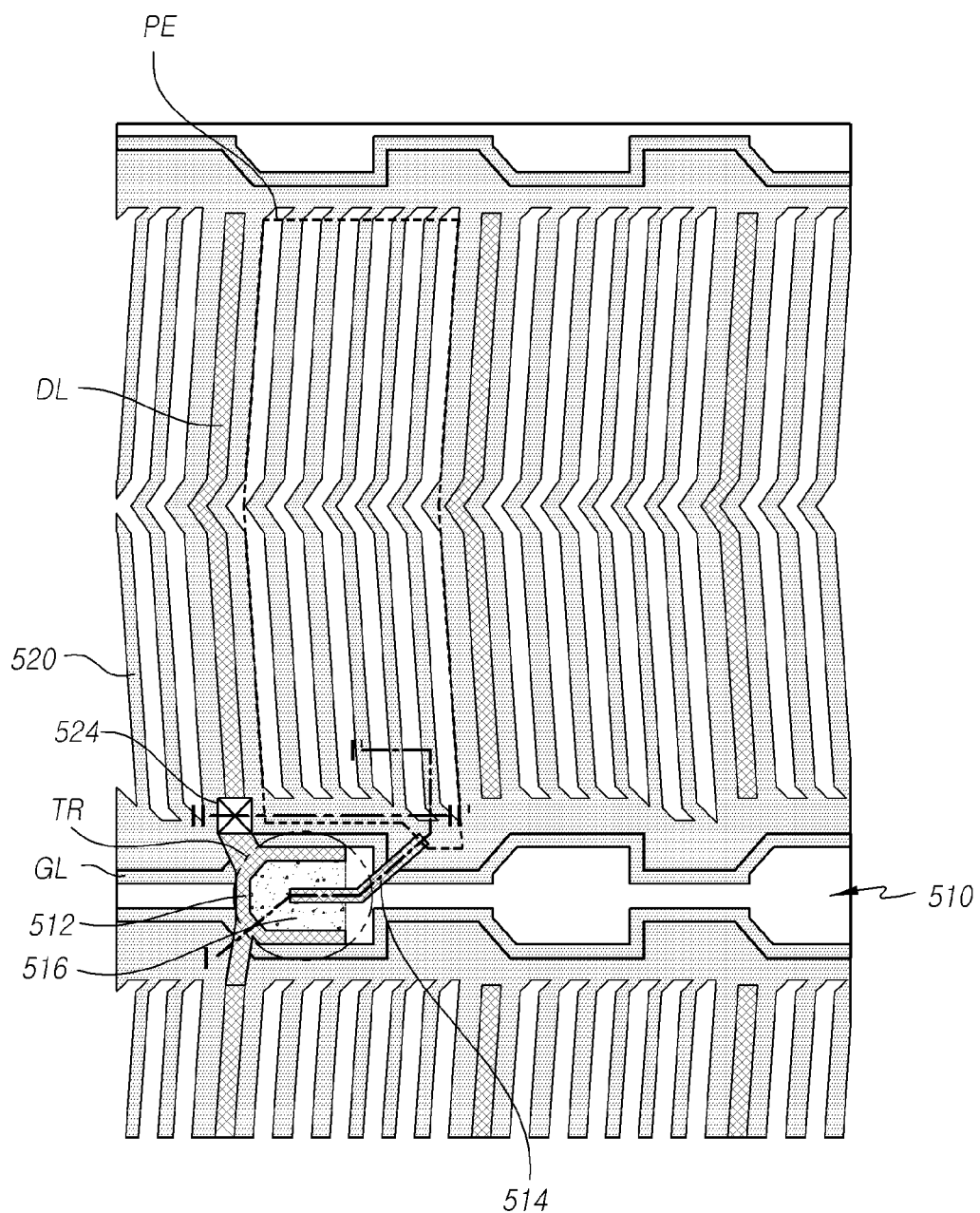
FIG. 5 is a plan view illustrating a structure of a display panel according to an exemplary embodiment.
Figure 6:
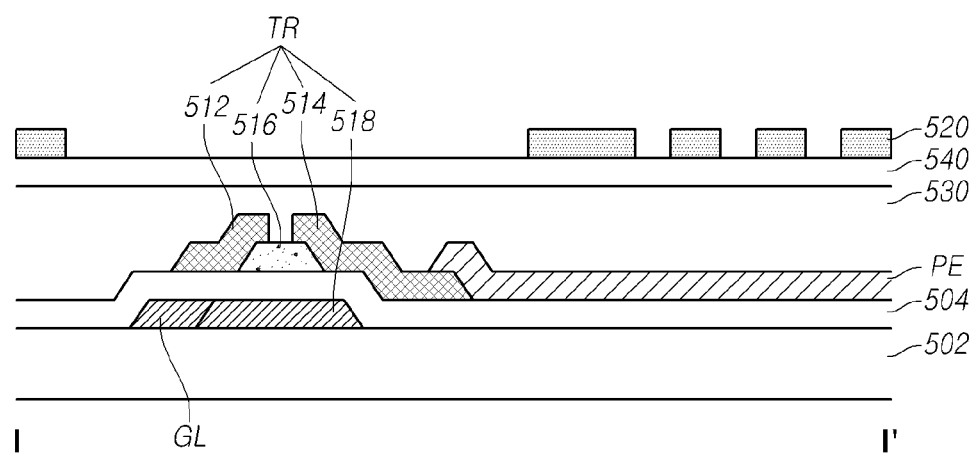
FIG. 6 is a cross-sectional view taken along a line I-I' of FIG. 5.
Figure 7:
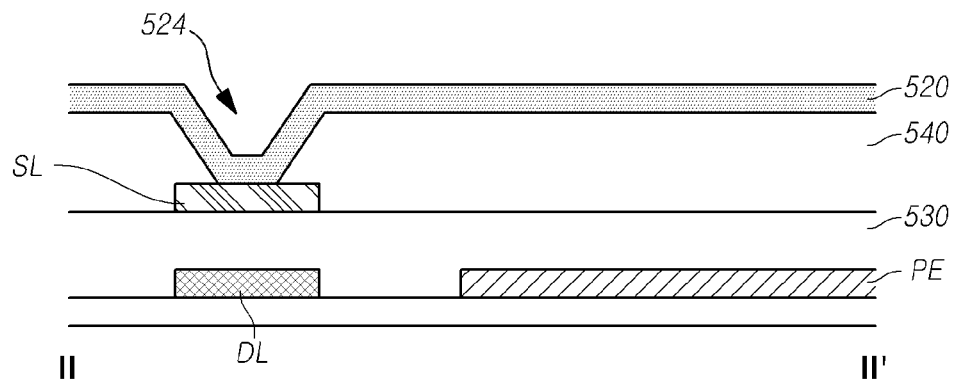
FIG. 7 is a cross-sectional view taken along a line II-II' of FIG. 5.

FIG. 5 is a plan view illustrating a structure of a display panel according to an exemplary embodiment, FIG. 6 is a cross-sectional view taken along a line I-I' of FIG. 5, and FIG. 7 is a cross-sectional view taken along a line II-II' of FIG. 5.

Referring to FIG. 5 through FIG. 7, a display panel 500 includes a plurality of gate lines GLs disposed on a substrate 502 in a first direction, a plurality of data lines DLs disposed on the substrate 502 in a second direction, and sensing lines SLs disposed on the substrate 502 in parallel to the data lines DLs.

A plurality of pixel areas are defined on the substrate 502 at intersections between the gate lines GLs and the data lines DLs.

A transistor TR is disposed at an intersection between the gate line GL and the data line DL in a pixel area. The transistor may also be referred to as a thin film transistor (TFT).

The transistor TR may include a gate electrode 518, a semiconductor layer 516, a source electrode 512, and a drain electrode 514.

The gate electrode 518 is formed by extending the gate line GL.

The semiconductor layer 516 forms an active area of the transistor TR. The semiconductor layer 516 may be formed of amorphous silicon (a-Si) or oxide semiconductor such as zinc oxide (ZnO)-based oxide, for example, IGZO (Indium Gallium Zinc Oxide), ZTO (Zinc Tin Oxide), ZIO (Zinc Indium Oxide), and the like, but is not limited thereto.

The source electrode 512 is formed by extending the data line DL, and the drain electrode 514 is connected to the pixel electrode PE.

Based on the stack positions, the gate line GL is formed on the substrate 502 and a gate insulation layer 504 is formed on the gate line GL. Further, the data line DL, the source electrode 512, the drain electrode 514, and the pixel electrode PE are formed on the gate insulation layer 504.

An organic protection layer 530 functioning as both an interlayer insulation layer and a protection layer is formed on the gate insulation layer 504 on which the data line DL, the transistor TR, and the pixel electrode PE are formed.

The organic protection layer 530 may be formed of a material such as photo-acryl, acrylate, polyamide, benzocyclobutene (BCB), etc., but is not limited thereto.

On the organic protection layer 530, the sensing line SL is formed of a different material in a different layer from the data line DL as being overlapped with the data line DL.

Herein, the sensing line SL may be formed of a low-resistance metal or alloy such as aluminum (Al), aluminum-neodymium (AlNd), copper (Cu), molybdenum (Mo), molybdenum-titanium (MoTi), chromium (Cr), etc., but is not limited thereto.

An inorganic protection layer 540 functioning as both an interlayer insulation layer and an additional protection layer is formed on the organic protection layer 530 on which the sensing line SL is formed.

The inorganic protection layer 540 may be formed of an inorganic insulation material such as silicon nitride (SiNx) or silicon oxide (SiO$_2$), but is not limited thereto.

A common voltage electrode 520 may be formed on the inorganic protection layer 540.

The common voltage electrode 520 may be electrically connected to the sensing line SL through a contact hole 524 penetrating the inorganic protection layer 540.

In the above description, a gate metal layer or a source/drain metal layer of the gate line or gate electrode may be formed of one of low-resistance metal materials such as aluminum (Al), aluminum alloy (AlNd), copper (Cu), copper alloy, molybdenum (Mo), and molybdenum alloy (MoTi), or two or more of them.

Further, in the above description, the common voltage electrode 520 may be a transparent electrode and may be formed of a transparent conductive material, for example, metal oxide such as indium-tin-oxide (ITO) or indium-zinc-oxide (IZO) or a combination of metal and oxide such as ZnO:Al or SnO$_2$:Sb, with a relatively high work function.

Furthermore, in the above description, the gate insulation layer 504 and the inorganic protection layer 540 may be formed of an inorganic insulation material such as silicon oxide (SiO$_2$) or silicon nitride (SiNx), but is not limited thereto and may also be formed of other electrically insulated materials.

Meanwhile, referring to FIG. 5 again, the plurality of gate lines GLs for supplying a scan signal are disposed in the display panel 500. Within the touch electrode, the common voltage electrodes 520 are connected to each other in a direction parallel to a longitudinal direction of the gate lines GLs. Further, the common voltage electrodes 520 are separated from each other in a direction intersecting with the longitudinal direction of the gate lines GLs.

A separation space 510 is formed between the common voltage electrodes 520 in the direction parallel to the longitudinal direction of the gate lines GLs. In the conventional display panel 10, such a separation space exists only between touch electrodes but is not formed within a touch electrode. Therefore, in the conventional display panel 10, the common voltage electrode 520 is overlapped on the gate line GL within the touch electrode, so that the gate electrode 518 connected to the gate line GL has a relatively large amount of capacitance.

In the display panel 500 according to an exemplary embodiment, the separation space 510 is formed in the direction parallel to the gate lines GL regardless of being inside the touch electrode and at an outer periphery of the touch electrode. Therefore, a capacitance of the gate electrode 518 becomes substantially uniform regardless of being inside the touch electrode and at an outer periphery of the touch electrode.

The separation space 510, i.e., separation area, formed between different rows of the common voltage electrodes 520 may correspond to a line area of the gate lines GL. Specifically, in the exemplary embodiment as illustrated in FIG. 5, the gate line GL or a portion of the gate line GL may be formed in the separation space 510 between two common voltage electrodes 520. The gate line GL and an electrode adjacent thereto greatly affect a capacitance of the gate electrode 518. By positioning the separation space 510 on the gate line GL, a capacitance of the gate electrode 518 may be decreased and the transistor TR may be driven at an increased speed.

A part of the common voltage electrode 520 corresponding to a channel region of the transistor TR may be opened. In the exemplary embodiment as illustrated in FIG. 5, the separation space 510 may be formed in a part corresponding to an area, i.e., channel region, where the semiconductor layer 516 is disposed. This structure has an effect of reducing capacitances formed between the common voltage electrode 520 and the gate electrode 518, the source electrode 512, and the drain electrode 514 and thus lowering a capacitance of the gate electrode 518.

Meanwhile, although not illustrated in the drawing, a liquid crystal layer may be disposed on the pixel electrode PE and the common voltage electrode 520. A structure in which the pixel electrode PE and the common voltage electrode 520 are positioned on one side of the liquid crystal layer is called the in-plane structure. In the in-plane structure, the common voltage electrode 520 may be disposed adjacent to the transistor TR. Therefore, in the in-plane structure, a capacitance between the common voltage electrode 520 and the gate electrode 518 may become a big problem. If the separation space 510 is formed between common voltage electrode rows in the in-plane structure as suggested in an exemplary embodiment, a capacitance between the common voltage electrode 520 and the gate electrode 518 may become more uniform.

Meanwhile, although it is illustrated that the sensing line SL and the pixel electrode PE are disposed in different layers, the sensing line SL and the pixel electrode PE may be disposed in the same layer. In this case, the pixel electrode PE and the sensing line SL may be disposed on the transistor TR and the common voltage electrode 520 may be formed on the sensing line SL. In this structure, the sensing line SL and the pixel electrode PE are disposed between the transistor TR and the common voltage electrode 520. Thus, coupling between the transistor TR and the common voltage electrode 520 is reduced.

FIG. 8 is a configuration view of a display device according to an exemplary embodiment.

Referring to FIG. 8, a display device 800 may include a display panel 500, a gate driver 820, a data driver 830, a timing controller 840, and a touch driver 850. Further, in the display panel 500, a pixel P on which a common voltage electrode described above with reference to FIG. 3 through FIG. 7 is disposed and a touch electrode TE formed by connecting a plurality of common voltage electrodes may be disposed.

The gate driver 820 may supply a scan signal of a turn-on voltage or turn-off voltage to the gate line GL according to the control of the timing controller 840.

If a specific gate line GL is electrically disconnected from the gate driver 820, the data driver 830 may convert image data received from the timing controller 840 into a data voltage of an analog form and supply the data voltage to the data line DL.

When the data driver 830 supplies the data voltage to the data line DL, the data driver 830 may supply the data voltage to a pixel electrode. In this case, the data driver 830 may sense the common voltage formed in the common voltage electrode or use a predetermined reference voltage as a common voltage.

The touch driver 850 may supply a touch driving signal to the touch electrode TE and receive a response signal in response to the touch driving signal and thus recognize an approach or touch of an external object with respect to the display panel 500.

The touch driver 850 may drive the touch electrode TE in a mutual-driving mode or in a self-driving mode.

In the mutual-driving mode, the touch electrode TE is divided into a TX electrode and an RX electrode, and the touch driver 850 may supply a touch driving signal to the TX electrode and receive a response signal through the RX electrode capacitively coupled to the TX electrode.

In the self-driving mode, the touch electrode TE may supply a touch driving signal to one touch electrode TE and receive a response signal from the corresponding touch electrode TE.

The timing controller 840 may supply various control signals to the gate driver 820, the data driver 830, and the touch driver 850.

The timing controller 840 may start a scan according to timing implemented in each frame and convert image data input from the outside to be suitable for a data signal form used by the data driver 830. Then, the timing controller 840 may output the converted image data to the data driver 830 and control a driving of data at a proper time corresponding to the scan.

Each of the gate driver 820, the data driver 830, and the touch driver 850 may include one or more integrated circuits. For example, the data driver 830 may include at least one source driver integrated circuit (SDIC).

Meanwhile, the data driver 830 and the touch driver 850 may be implemented in one integrated circuit. For example, a display driver including the data driver 830 and the touch driver 850 may be implemented in the form of a touch display driver integrated circuit (TDDI).

An exemplary embodiment of a touch-integrated display panel and a touch-integrated display device has been described above. In a conventional display panel, a difference in size between a common voltage electrode inside a touch electrode and a common voltage electrode at an outer periphery of the touch electrode causes non-uniformity in gate voltage of each pixel and thus results in a pixel defect and a horizontal line defect. However, in a display device according to the above-described exemplary embodiment, a horizontal line defect occurring at an outer periphery of a touch electrode can be removed. Further, according to the above-described exemplary embodiment, the sizes of common voltage electrodes of each pixel area included in a touch electrode of a touch-integrated display device can be equalized. Furthermore, according to the above-described exemplary embodiment, a difference in capacitance between transistors positioned inside and outside a touch electrode of a touch-integrated display device can be reduced.

The term "comprises", "includes" or "has" and/or "comprising", "including" or "having" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added. All terms including technical and scientific terms used herein are in effect equivalent to terms generally understood by those skilled in the art unless they are defined otherwise. Terms defined in a generally used dictionary shall be construed as having meanings equivalent to contextual meanings used in the art, but shall not be construed as having ideal or excessively forming meanings unless they are clearly defined herein.

The above descriptions are provided only for illustration of the technical concept of the present invention, and it would be understood by those skilled in the art that various changes and modifications may be made without changing essential features of the present invention. Therefore, the exemplary embodiments of the present invention are provided for illustrative purposes only but not intended to limit the technical concept of the present invention. The scope of the technical concept of the present invention is not limited thereto. Therefore, it should be understood that the above-described exemplary embodiments are illustrative in all aspects and do not limit the present invention. The protective scope of the present invention should be construed based on the following claims, and all the technical concepts in the equivalent scope thereof should be construed as falling within the scope of the present invention.

What is claimed is:

1. A display device comprising:
   a plurality of pixel electrodes;
   a plurality of touch electrodes, each of the touch electrodes including a group of common voltage electrodes among a plurality of common voltage electrodes, each of the common voltage electrodes in the group of common voltage electrodes being connected in a same layer to its one or more adjacent remaining ones in the group of common voltage electrodes in a first direction and overlapping two or more corresponding pixel electrodes of the display device, said each of the plurality of common voltage electrodes separated from other one or more adjacent ones of the plurality of common voltage electrodes in a second direction;
   a plurality of sensing lines, each of the sensing lines coupled to a corresponding touch electrode of the plurality of touch electrodes, electrically connecting directly adjacent common voltage electrodes in the group of common voltage electrodes of the corresponding touch electrode, and transferring a touch driving signal to the corresponding touch electrode; and
   a plurality of transistors, each of the plurality of transistors including a gate electrode, a source electrode, and a drain electrode configured to transfer a data voltage to a corresponding pixel electrode of the plurality of pixel electrodes.

2. The display device according to claim 1, wherein a separation distance between two adjacent common voltage electrodes of the common voltage electrodes in a touch electrode of the plurality of touch electrodes is substantially equal to a separation distance between two adjacent touch electrodes of the plurality of touch electrodes.

3. The display device according to claim 1, wherein the plurality of sensing lines are elongated along the second direction.

4. The display device according to claim 1, further comprising:
   a plurality of gate lines coupled to the plurality of transistors, each of the plurality of gate lines configured to supply a scan signal to a gate electrode of a corresponding transistor of the plurality of transistors,
   wherein the plurality of gate lines are elongated along the first direction.

5. The display device according to claim 1, further comprising:
   a plurality of gate lines coupled to the plurality of transistors, each of the plurality of gate lines configured to supply a scan signal to a gate electrode of a corresponding transistor of the plurality of transistors,
   wherein said each of the plurality of gate lines is formed in a corresponding separation area between two adjacent common voltage electrodes of the plurality of common voltage electrodes.

6. The display device according to claim 1, wherein said each of the plurality of transistors includes a channel region formed in a corresponding separation area between two adjacent common voltage electrodes of the plurality of common voltage electrodes.

7. The display device according to claim 1, wherein a liquid crystal layer is positioned on the plurality of pixel electrodes and the plurality of common voltage electrodes.

8. The display device according to claim 1, wherein the plurality of sensing lines are formed on a same layer as the plurality of pixel electrodes.

9. The display device according to claim 1, wherein the plurality of common voltage electrodes are positioned on the plurality of sensing lines.

10. The display device according to claim 1, further comprising:
    a data driver configured to supply the data voltage to one of the plurality of pixel electrodes in response to a common voltage at one of the plurality of common voltage electrodes; and
    a touch driver configured to supply a touch driving signal to the plurality of common voltage electrodes, receive a response signal in response to the touch driving signal, and recognize an approach or touch of an external object based on the response signal.

11. A display device comprising:
    a plurality of pixel electrodes;
    a plurality of touch electrodes, each of the touch electrodes including a group of common voltage electrodes among a plurality of common voltage electrodes elongated along a first direction and overlapping two or more corresponding pixel electrodes of the display device;
    a plurality of sensing lines elongated along a second direction and intersecting the plurality of common voltage electrodes, each of the plurality of sensing lines coupled to a corresponding touch electrode of the plurality of touch electrodes and electrically connecting directly adjacent common voltage electrodes in the group of the common voltage electrodes of the corresponding touch electrode; and
    a plurality of pixels including a plurality of transistors, each of the plurality of transistors to control an amount of light output from a corresponding pixel of the plurality of pixels according to a voltage at a gate electrode of said each of the plurality of transistors, the gate electrode formed in a corresponding separation area between two adjacent common voltage electrodes of the plurality of common voltage electrodes.

12. The display device according to claim 11, wherein the plurality of touch electrodes include:
   a first touch electrode including at least a first common voltage electrode and a second common voltage electrode adjacent to each other and separated by a first distance; and
   a second touch electrode including at least a third common voltage electrode and a fourth common voltage electrode adjacent to each other, the second common voltage electrode and the third common voltage electrode adjacent to each other and separated by a second distance equal to the first distance.

13. The display device according to claim 11, further comprising:
   a plurality of gate lines coupled to the plurality of pixels, each of the plurality of gate lines configured to supply a scan signal to a gate electrode of a corresponding transistor of the plurality of transistors,
   wherein the plurality of gate lines are elongated along the first direction.

14. The display device according to claim 13, wherein said each of the plurality of gate lines is formed in the corresponding separation area between the two adjacent common voltage electrodes of the plurality of common voltage electrodes.

15. The display device according to claim 11, wherein said each of the plurality of transistors includes a channel region formed in the corresponding separation area between the two adjacent common voltage electrodes of the plurality of common voltage electrodes.

16. The display device according to claim 11, further comprising data lines overlapping with the plurality of sensing lines, the data lines configured to provide a data voltage for displaying an image to the plurality of transistors, the plurality of sensing lines disposed between the plurality of common voltage electrodes and the data lines.

17. The display device according to claim 11, wherein each of the plurality of pixel electrodes faces a corresponding common voltage electrode of the plurality of common voltage electrodes in the corresponding pixel of the plurality of pixels.

18. The display device according to claim 17, wherein the plurality of sensing lines are formed on a same layer as the plurality of pixel electrodes.

* * * * *